US011641393B1

(12) United States Patent
Shetty et al.

(10) Patent No.: US 11,641,393 B1
(45) Date of Patent: May 2, 2023

(54) SYSTEMS AND METHODS FOR FEATURE SUPPORT CUSTOMIZATION BASED ON DATA SOURCE CAPABILITY

(71) Applicant: SAP SE, Walldorf (DE)

(72) Inventors: Arpitha A Shetty, Dakshina Kannada (IN); Devicharan Vinnakota, Bangalore (IN); Vijaya Pramilamma Bovilla, Bangalore (IN); Unmesh Sreedharan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/523,741

(22) Filed: Nov. 10, 2021

(51) Int. Cl.
| | | |
|---|---|---|
| *G06F 15/173* | (2006.01) | |
| *G06F 15/177* | (2006.01) | |
| *H04L 67/104* | (2022.01) | |
| *H04L 67/1029* | (2022.01) | |
| *H04L 67/1031* | (2022.01) | |

(52) U.S. Cl.
CPC ...... *H04L 67/1053* (2013.01); *H04L 67/1029* (2013.01); *H04L 67/1031* (2013.01); *H04L 67/1048* (2013.01)

(58) Field of Classification Search
CPC ............. H04L 67/1029; H04L 67/1031; H04L 67/1051; H04L 67/1053
USPC .................................. 709/223–224, 220–221
See application file for complete search history.

(56) References Cited

U.S. PATENT DOCUMENTS

| | | | |
|---|---|---|---|
| 8,161,100 B1* | 4/2012 | Lopez .................... | H04W 4/50 709/217 |
| 10,063,490 B2* | 8/2018 | Wang ...................... | H04L 47/70 |
| 11,159,625 B1* | 10/2021 | Vyas .................. | H04L 67/1027 |
| 2003/0101245 A1* | 5/2003 | Srinivasan .............. | H04L 67/34 709/221 |
| 2014/0280796 A1* | 9/2014 | Pijewski ................ | H04L 67/10 709/220 |
| 2015/0089031 A1* | 3/2015 | Kalali ..................... | H04L 67/34 709/220 |
| 2016/0358237 A1* | 12/2016 | Mohammed .......... | G06Q 30/06 |
| 2017/0104629 A1* | 4/2017 | Cobb .................... | H04L 41/083 |
| 2019/0050775 A1* | 2/2019 | Bijor ..................... | H04L 67/535 |
| 2019/0303466 A1* | 10/2019 | Khurana .......... | G06F 16/24568 |
| 2023/0039601 A1* | 2/2023 | Kattimani .............. | H04L 67/34 |

* cited by examiner

*Primary Examiner* — Bharat Barot
(74) *Attorney, Agent, or Firm* — Fountainhead Law Group P.C.

(57) ABSTRACT

Systems, methods, and techniques for supporting feature customization based on data source capability. A first request is received from an external entity to provision an instance of an application. An application service of a plurality of application services is identified to be implemented to fulfill the first request. A configuration of the application corresponding to the application service is determined. Customization information regarding states of a set of features of the application instance is obtained as a result of determining that a customization is associated with the external entity. A modified configuration is generated for the application based on the customization information and the configuration. An application instance is provisioned to the external entity over the one or more networks having the modified configuration.

20 Claims, 8 Drawing Sheets

SYSTEMS AND METHODS FOR FEATURE SUPPORT CUSTOMIZATION BASED ON DATA SOURCE CAPABILITY

BACKGROUND

The present disclosure relates to computing, and more particularly, to customization of features of a cloud-computing system.

The use of cloud computing services is a popular solution to accommodate the growing needs of businesses. A cloud-computing resource service provider may develop applications and software for servicing a plurality of entities in different industries. In some instances, multiple entities may wish to use the same application, but different entities may wish to access different features of the application.

Customizing features of a cloud-computing application presents a complex challenge to a service provider. Modifying an application according to each user's desired features would be a resource and time intensive endeavor for the cloud-computing resource service provider. On the other hand, providing the user with access to potentially sensitive systems and source code could expose the cloud-computing resource service provider to theft of valuable intellectual property. Moreover, the user may have to procure or redirect the skills of valuable computer scientists to understand and adapt the cloud-based applications to meet the user's desired feature set.

SUMMARY

Embodiments of the present disclosure include systems and methods for feature support customization based on data source capability. The techniques described herein may be embodied in non-transitory machine-readable medium storing a program executable by a computer system, the program comprising sets of instructions for performing as described herein. In some embodiments, a system includes one or more processors and a non-transitory machine-readable medium storing instructions that when executed by at least one of the one or more processors cause at least one of the one or more processors to perform as described herein. In some embodiments, the non-transitory machine-readable medium may be memory, for example, which may be coupled to the aforementioned one or more processors, for example.

The following techniques and features may be embodied alone or in different combinations and may further be embodied with other techniques and features described herein.

The present disclosure includes a method comprising receiving, over one or more networks, a first request from an external entity to provision an instance of an application; identifying an application service of a plurality of application services to be implemented to fulfill the first request; determining a configuration of the application corresponding to the application service; determining that a customization for the application service is associated with the external entity; obtaining customization information regarding states of a set of features to be implemented in the instance as a result of determining the customization associated with the external entity; generating a modified configuration for the application based on the customization information and the configuration; and provisioning, over the one or more networks, the instance having the modified configuration to the external entity.

In some embodiments, the method comprises sending a second request to the application service to provide the customization information based on the identifier of the external entity; and receiving, from the application service, the customization information.

In some embodiments, the method comprises receiving, over the one or more networks during a setup process for the application, a communication from the external entity specifying a customized configuration for the application, wherein the customization information is generated based on the customized configuration specified.

In some embodiments, the method comprises establishing a connection between the application and the application service to support operation of the instance. In some embodiments, the instance provisioned includes a user interface having a set of features corresponding to the modified configuration of the application service. In some embodiments, the customization information is obtained using an identifier associated with the external entity. In some embodiments, the first request includes a parameter corresponding to the application service. In some embodiments, the application service corresponds to an industry with which the external entity is involved.

The present disclosure includes a computer system comprising one or more processors; and memory storing instructions that, as a result of execution by the one or more processors, cause the computer system to receive, over one or more networks, a first request from a first external entity to provision an first instance of an application; identify a first application service of a plurality of first application services to be implemented based on the first request; determine a first configuration of the application corresponding to the first application service; determine that a first customization for the first application service is associated with the first external entity; obtain first customization information indicating a first set of features to be implemented in the first instance as a result of determining the customization associated with the first external entity; generate a first modified configuration for the application based on the customization information and the configuration; and provision, over the one or more networks, the first instance having the first modified configuration to the first external entity.

In some embodiments, execution of the instructions by the one or more processors causes the computer system to receive, over the one or more networks, a second request from a second external entity to provision a second instance of the application; identify a second application service of the plurality of application services to be implemented based on the second request; determine a second configuration of the application corresponding to the second application service; determine that a second customization for the second application service is associated with the second external entity; obtain second customization information regarding states of a second set of features to be implemented in the second instance as a result of determining the customization associated with the second external entity; generate a second modified configuration for the application based on the customization information and the configuration; and provision, over the one or more networks, the second instance having the second modified configuration to the second external entity.

In some embodiments, execution of the instructions by the one or more processors causes the computer system to obtain, from data storage of the first application service, information identifying the first set of features based on an identifier of the first external entity.

In some embodiments, execution of the instructions by the one or more processors causes the computer system to receive, over the one or more networks during a setup process for the application, a communication from the first external entity specifying states of the first set of features to be associated with an identifier of the first external entity.

In some embodiments, execution of the instructions by the one or more processors causes the computer system to send a second request to the application service to provide the customization information based on the identifier of the external entity; and receive, from the application service, the customization information.

In some embodiments, the customization information is obtained using an identifier associated with the external entity. In some embodiments, the customized instance provisioned including a user interface having a set of features corresponding to the configuration of the first application service modified based on the first set of features. In some embodiments, the first request includes a parameter corresponding to the application service.

The present disclosure includes a non-transitory computer readable storage medium storing instructions that, as a result of execution by one or more processors, cause the one or more processors to receive, over the one or more networks, a second request from a second external entity to provision a second instance of the application; identify a second application service of the plurality of application services to be implemented based on the second request; determine a second configuration of the application corresponding to the second application service; determine that a second customization for the second application service is associated with the second external entity; obtain second customization information regarding states of a second set of features to be implemented in the second instance as a result of determining the customization associated with the second external entity; generate a second modified configuration for the application based on the customization information and the configuration; and provision, over the one or more networks, the second instance having the second modified configuration to the second external entity.

In some embodiments, execution of the instructions stored on the non-transitory computer readable storage medium causes the one or more processors to receive, over the one or more networks during a setup process for the application, a communication from the first external entity specifying states of the first set of features to be associated with an identifier of the first external entity.

In some embodiments, execution of the instructions stored on the non-transitory computer readable storage medium causes the one or more processors to establish connections between the application and a plurality of application services to support operation of the customized instance.

In some embodiments, the customization information is obtained using an identifier associated with the external entity.

The following detailed description and accompanying drawings provide a more thorough understanding of the nature and advantages of the present disclosure.

DETAILED DESCRIPTION

Described herein are techniques for feature support customization based on data source capability according to one or more embodiments. The systems, apparatuses, methods, and techniques described below may be implemented as a computer program (e.g., software, application) executing on one or more computer systems. The computer program may further be stored on one or more computer-readable media. The computer-readable media may store instructions that, as a result of execution by one or more processors of a computer system, cause the computer system to perform the processes described below.

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
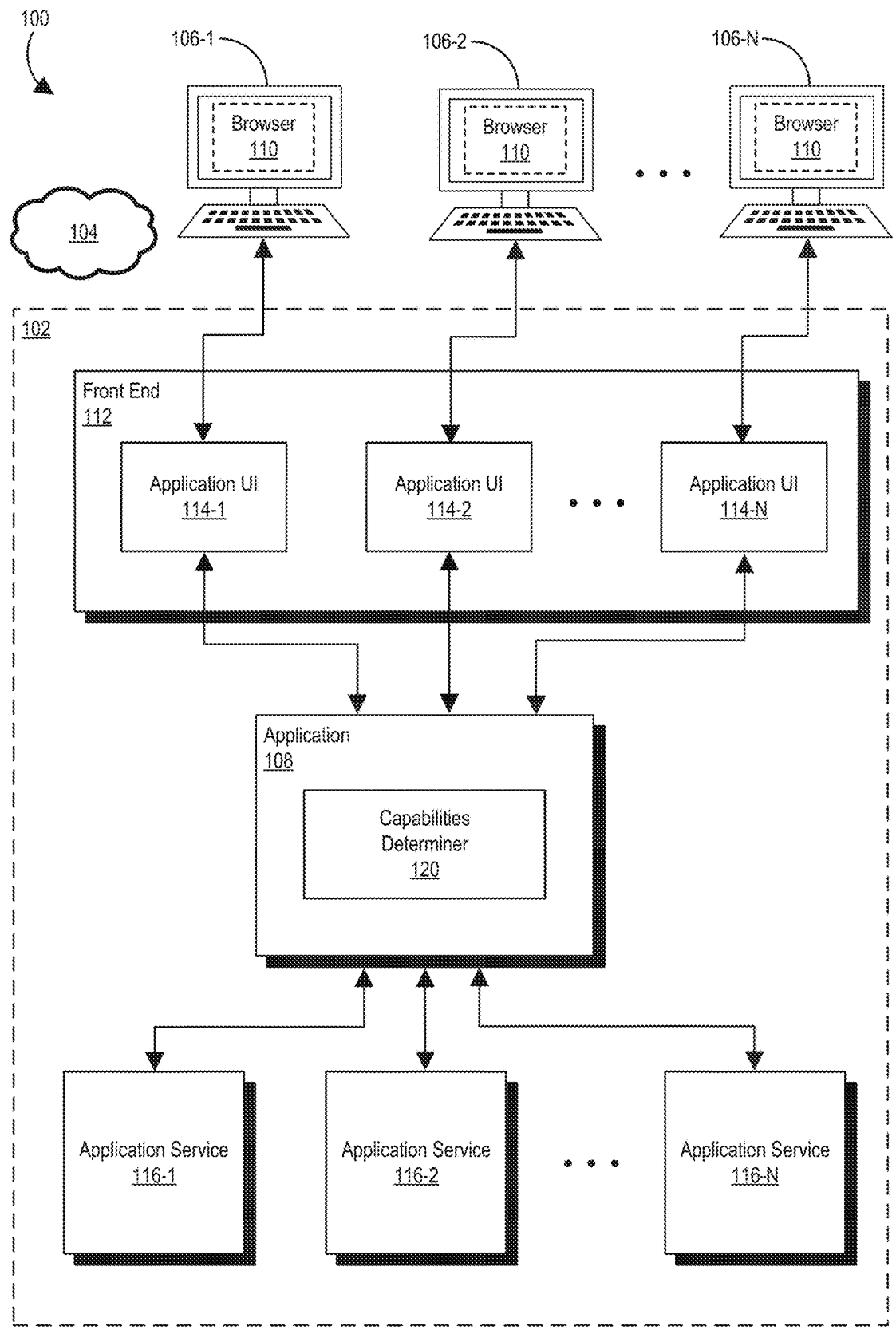
FIG. 1 illustrates a first example environment including a computer system for feature support customization based on data source capability according to one or more embodiments.

FIG. 1 illustrates an environment 100 including a computer system 102 for feature support customization based on data source capability according to one or more embodiments. The computer system 102 may be of a computing services provider that provides cloud-based services to customer entities over one or more networks 104. In particular, a set of computing systems 106-1, 106-2, . . . 106-N (collectively "computing systems 106") of one or more customer entities may communicate, over the one or more networks 104, with the computing system 102 to interact with an application 108 of the computing services provider. The computing systems 106 may be equipped with a program, such as an internet browser 110, through which a user may interact with the application 108 on behalf of the entity. The computing system 102 may be a distributed computing system in which a plurality of processor-based devices (e.g., servers) operate to provide services and applications described herein.

The computing system 102 includes a front-end layer 112 that facilitates interaction with the application 108, e.g., via a set of application user interfaces 114-1, 114-2, . . . 114-N. The front-end layer 112 may be a gateway to the application 108 and services provided by the application 108. Authorization or user authentication of the computing systems 106 may be required for access to the front-end layer 112, the application 108, and/or data exchanges through the front-end layer 112. For example, the front-end layer 112 may enable a web-based platform or a console-based platform that provides information related to the application 108 and services of the computing resource service provider to an external entity. The front-end layer 112 may enable the entity to execute applications or tasks in the computing resource service provider, track and manage operation of and interactions with the application 108, receive the results of the execution, and transmit the results to the computing systems 106. As further described herein, the front-end layer 112 may be the gateway by which the entities and/or the computer systems 106 may utilize the application 108 and services provided through the application 108 that are provided by the computing resource service provider.

Different customer entities associated with the computer systems 106 may desire to access different features or functionality available through the application 108. The application 108 may be one of a plurality of applications provided by the computing resources service provider. Non-limiting examples of the application 108 include a cloud computing application that provides compute capacity, such as virtual machines and data storage; a database application; an application for streaming and processing audiovisual media; an application for managing internet-of-things data and devices; and an application for building, deploying, and/or managing mobile and web software. Entities associated with the computer systems 106 may desire to use the application 108, but each entity may be involved in a different industry or have a different purpose.

As a specific, non-limiting example, the application 108 may be an analytics application for collecting, analyzing, and presenting data. A first user associated with a first computer system 106-1 may wish to use the analytics application for enterprise resource planning A second user associated with a second computer system 106-2 may wish to use the analytics application for human resource management. A third user associated with a third computer system 106-3 may wish to use the analytics application for supply chain management. Although all three users may use the same application 108, different functionality and different user interface elements may be appropriate for different users. Even among users utilizing the application 108 for the same purpose (e.g., supply chain management), one user may wish to have a first customized set of features for the application 108 whereas another user may wish to have a second customized set of features for the application 108. As discussed above, it is onerous and inefficient for the user(s) or the computing resource service provider to customize the application 108 for each use case.

The computer system 102 includes a plurality of application services 116-1, 116-2, . . . 116-N (collectively "application services 116") that support features for the application 108. More particularly, each of the application services 116 has a different set of capabilities and settings that modify the functionality, user interface elements, and/or other features of the application 108 in a corresponding one of the computer systems 106. In some embodiments, the application services 116 are independent from one another and do not interact with each other. Each of the application services 116 may be provided with a data source specific to the application service. During operation of the computer system 102, for example, the computer system 106-1 implementing the application service 116-1 with the application may access a first data source allocated to the application service 116-1, but may be unable to access a second data source allocated to the application service 116-2.

Each of the application services 116 may be of the same application type, but may have a different set of capabilities. As a non-limiting example, the application 108 may be an analytics application that collects, analyzes, and presents data. Each of the application services 116 may be provided with a set of capabilities for a particular purpose or intended use. The application service 116-1 may be for financial analytics, the application service 116-2 may be for supply chain analytics, a third application service 116-3 may be for healthcare, and so on. As described herein, one or more of the application services 116 may be further customized according to a user's preferences.

In connection with a request to access the application 108 from one of the computer systems 106, the front-end 112 receives service information regarding application service 116 to be utilized with the application 108. The application 108 includes a capabilities determiner 120 that determines a set of capabilities of an application service corresponding to the service information provided. As a result of determining the capabilities of the associated application service, the capabilities determiner 120 configures the features of the application 108 presented via an application user interface 114 on a corresponding one of the computer systems 106.

The one or more networks 104 may include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server for receiving requests and serving content in response thereto, although for other networks an alternative device serving a similar purpose could be used as would be apparent to one of ordinary skill in the art.

The computer system 102 includes one or more servers and data stores associated with individual servers. It should be understood that there can be several servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store", "data storage", or "memory" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the external entity.

Figure 2:
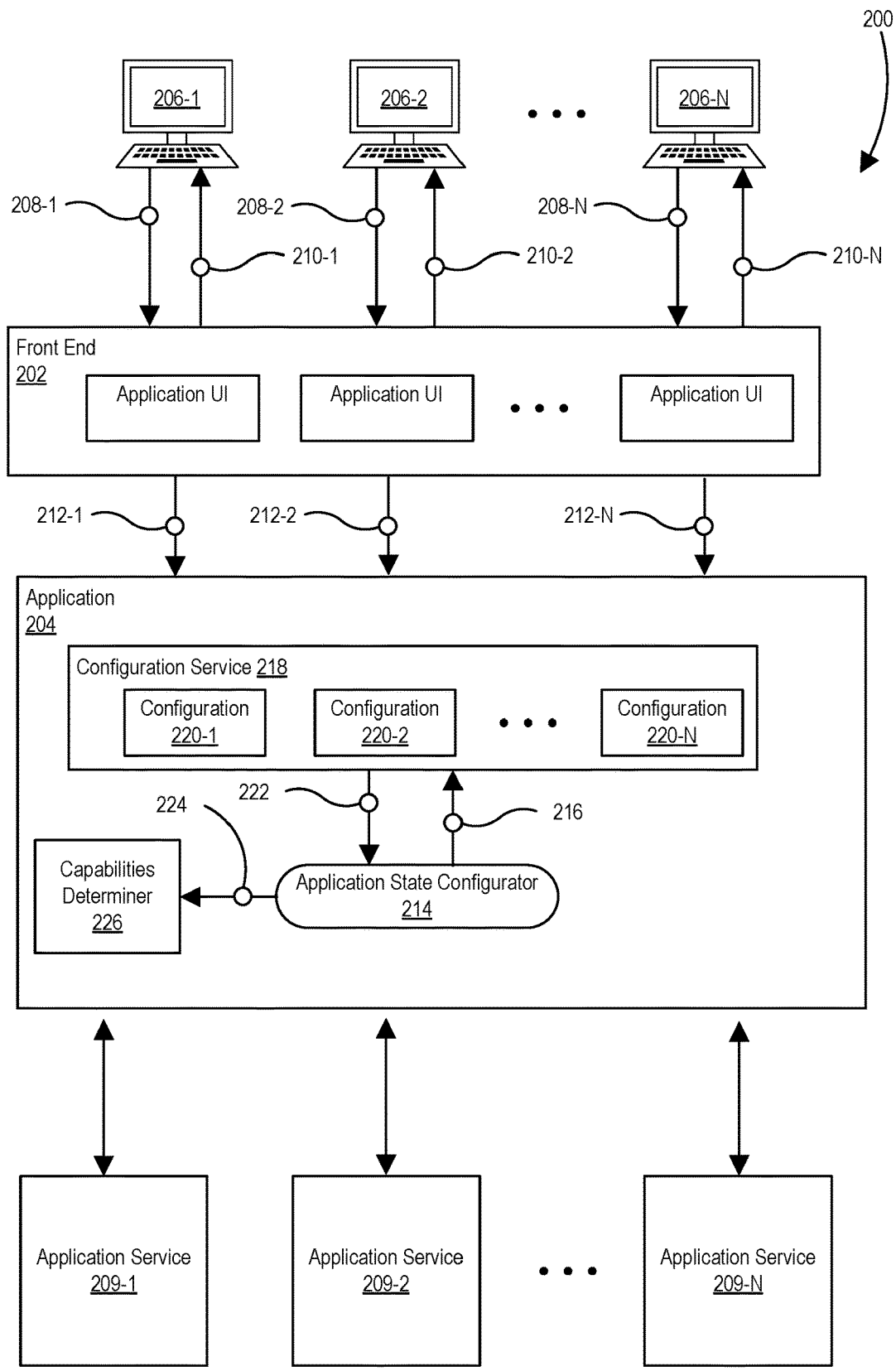
FIG. 2 illustrates a second example environment in which a computing system of the computing resources service provider operates according to one or more embodiments.

FIG. 2 shows an environment 200 in which a computing system of a computing resources service provider operates according to one or more embodiments. The computing system includes a front-end layer 202 and an application 204, as described with respect to FIG. 1. In the environment 200, a plurality of external computer systems 206-1, 206-2, . . . 206-N respectively send requests 208-1, 208-2, . . . 208-N (collectively "requests 208"; individually "request 208") to the front-end layer 202 to provision the application 204. The front-end layer 202 processes the requests 208 to determine an application service of a plurality of application services 209-1, 209-2, . . . 209-N (collectively "application services 209;" individually "application service 209") to be implemented in connection with provisioning the application 204.

One or more of the requests 208 may include information indicating an application service of the application services 209 to be implemented in connection with provisioning the application 204. For instance, the requests 208 may include a use parameter corresponding to a particular purpose that one of the application services 209 is configured to fulfill. The use parameter may be provided in a uniform resource locator (URL). In some implementations, one or more of the requests 208 may include information identifying the entity or entities associated with a request. As a particular, non-limiting example, the URL may specify the particular application 204, an application service 209, and/or user information of the requesting computer system 206.

The information indicating an application service of the application services 209 to be implemented may be generated by the computing systems 206 using information provided by the front-end layer 202. For instance, as a result of the computer systems 206 accessing the front-end layer 202, the front-end layer 202 may issue requests for input 210-1, 210-2, . . . 210-N (collectively "requests 210;" individually "request 210") respectively to the computer systems 206-1, 206-2, . . . 206-N. As a result of processing the requests 210, the computer systems 206 may provide a user interface with which a user may interact to provide input causing the application 204 to determine an application service of the application services 209 to be implemented.

In some embodiments, the requests 208 may be provided as a result of authorizing or authenticating the computer systems 206 via the front-end layer 202. As an example, the requests 210 provided by the front-end layer 202 may include requests to provide authentication information respectively to the computer systems 206-1, 206-2, . . . 206-N as a condition for provisioning the application 204. The requests 210 may include instructions that, as a result of execution by one or more processors of the computer systems 206, causes the computer systems 206 to present a user interface for providing authentication credentials, such as a username/password combination, two-factor authentication, an authentication device, etc. The front-end layer 202 may obtain information regarding the user requesting the application 204, such as account information stored in a user data store.

The front-end layer 202 may process the requests 208-1, 208-2, . . . 208-N to obtain identifying information regarding an application service of the application services 209 to be provisioned with the application 204 for the computer systems 206. Processing may include parsing a URL or other similar information provided in the requests 208 to obtain the information. The identifying information in the requests 208 may indicate an application service to be implemented. In some implementations, the identifying information may include information specific to the users of the computer systems 206, such as account information of the user, which can be used to determine feature customizations for the application 204. The front-end layer 202 provides requests 212-1, 212-2, . . . 212-N (collectively "requests 212;" individually "request 212") to the application 204 to provision a customized version of the application 204. The requests 212 may include the identifying information parsed from the requests 208. In response to receiving a request 212, the application 204 performs a process for connecting with a corresponding application service of the application services 209 and determining a feature customization for the application 204 to provision to a computer system 206.

The application 204 includes an application state configurator 214 that configures a state of the application 204 to be provisioned to a computer system 206 based at least in part on the request 208 provided by the computer system. The application state configurator 214 may be a software module executing on one or more processors of a computer system of the computing resources service provider, such as the computer system 102 of FIG. 1. The application state configurator 214, in some embodiments, determines a default configuration of the application 204 based on the request 208. For example, the application state configurator 214 may send a request 216 to a configuration service 218 associated with the application 204 to provide a defined configuration for the application 204. The application state configurator 214 may parse the use parameter from the request 212 and provide the use parameter, or information derived therefrom, to the configuration service 218 with the request 216.

The configuration service 218 may include or have access to data storage storing a set of defined configurations 220-1, 220-2, . . . 220-N (collectively "configurations 220") for the application 204. The configuration service 218 selects one of the defined configurations 220 based on information included in the request 216, such as the use parameter provided by the application state configurator 214 in one of the requests 208. As previously discussed, the use parameter may be provided by one of the computer systems 206 in the request 208. The configuration service 218 then provides a response 222 to the application state configurator 214 indicating the defined configuration selected. The defined configurations 220 may each correspond to a default configuration for the application service 209 to be implemented for the application 204. The defined configuration 220-1, for example, may provide a default configuration for an enterprise analytics purpose, the defined configuration 220-2 may provide a default configuration for a supply chain analytics use case, etc.

In response to receiving the request(s) 212, the application state configurator 214 sends a request 224 to a capabilities determiner 226 to determine a set of capabilities to be provided with the application 204. The request 224 includes information specifying which of the application services 209 is indicated for implementation in the request 208. For instance, the request 224 may include the use parameter or an identifier of one of the application services 209 to be implemented. The capabilities determiner 226 interacts with the application service 209 specified to determine the capabilities to be provided.

Figure 3A:
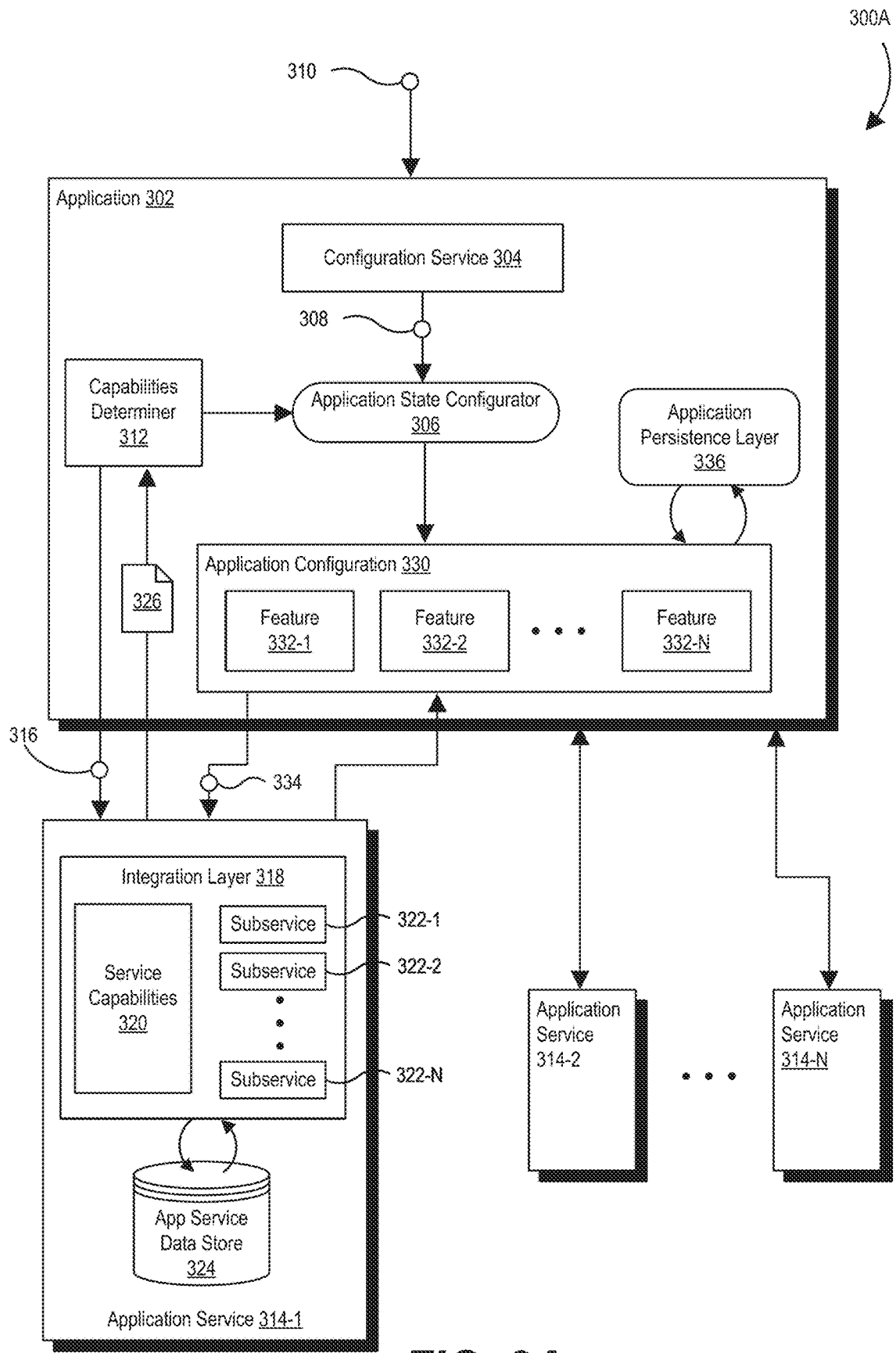
FIG. 3A illustrates a first view of a third example environment in which a computing system of the computing resources service provider operates according to one or more embodiments.

FIG. 3A shows an environment 300A in which a computing system of a computing resources service provider operates according to one or more embodiments. Various features of and described with respect to FIG. 3 are substantially similar to features described with respect to FIGS. 1, 2, and elsewhere herein, so further description thereof is omitted for brevity. An application 302 of the computing resources service provider includes a configuration service 304 and an application state configurator 306 that receives defined configuration information 308 from the configuration service 304, the defined configuration information 308 based on a request 310 received from a front-end layer. The application 302 also includes a capabilities determiner 312 that determines a set of capabilities of an application service 314-1 of a plurality of application services 314-1, 314-2, . . . 314-N indicated in the request 310.

The capabilities determiner 312 sends a request 316 to the application service 314-1 to specify a set of capabilities that the application service 314-1 is capable of performing. The application service 314-1 may be embodied as one or more processor-based devices (e.g., servers) executing a set of instructions stored in memory. One or more processor-based devices of the application service 314-1 may be separate than a processor-based device operating to implement the application 304. More particularly, the application service 314-1 may be configured (e.g., with executable instructions) to perform particular operations and obtain data involved fulfilling a full set of capabilities of the application service 314-1. For example, the application service 314-1 may be specifically configured to perform analysis and operations involved in enterprise resource planning, such as financial accounting and production planning. As another example, the application service 314-1 may be specifically configured to perform analysis and operations involved in supply chain management. As yet another example, the application service 314-1 may be specifically configured to perform analysis and operations involved in healthcare management. The application service 314-1 may be considered to be a back-end of the application 302 that performs operations and stores data on behalf of the application 302.

The request 316 may be generated according to an application-layer protocol and transmitted between to processor-based devices (e.g., servers) of the computing resources service provider. For instance, the request 316 may be formatted according to a Hypertext Transfer Protocol (HTTP) and include a request to obtain information regarding one or more of the processor-based devices associated with the application service 314-1 (e.g., getServerInfo request). The request 316, in some implementations, may include information identifying the entity that provided the request 208-1 described with respect to FIG. 2, such as a username or an account identifier.

The application service 314-1 includes an integration layer 318 that facilitates integration of features of the application service 314-1 with the application 302. The application service 314-1 includes a service capabilities module 320 that tracks and maintains a record of the capabilities of the application service 314-1. The service capabilities of the application service 314-1 include functional features specific to the particular purpose for which the application 302 is invoked by the requesting entity. For an analytics application, the application service 314-1 may be equipped with capabilities for running predictive analytics queries involving financial data, capabilities for analyzing data related to supply chain management, or capabilities for analyzing data related to manufacturing, by way of non-limiting example. The service capabilities of the application service 314-1 may include user interface features specific to the application service 314-1, such as a toolbar, data visualization (e.g., a dashboard), custom widgets, tabular navigation, text-entry fields, buttons, and blending, also by way of non-limiting example.

The application service 314-1 includes a plurality of subservices 322-1, 322-2, . . . 322-N (collectively "subservices 322") involved in achieving the capabilities tracked by the service capabilities module 320. Each of the subservices 322 may be configured to perform one or more functions associated with a capability. For instance, one of the subservices 322 may be configured to receive and fulfill requests to retrieve information, another of the subservices 322 may be configured to process and generate data according to a predictive model, and yet another of the subservices 322 may be configured to provide load balancing. In some implementations, one or more of the subservices 322 may be configured to perform a set of operations defined by a user that involve user-specified data.

The application service 314-1 also includes an application service data store 324 that stores data specific to the application service 314-1. As an example, for an application service 314-1 that is configured for enterprise resource planning, the application data store 324 may store data regarding revenue, forecasting, sales, available stock, price, cost, etc. The data specific to an entity or a user may include structured or unstructured data related to the purpose of the application service 314-1. In some embodiments, the application service data store 324 may be configured to store data that is specific to an entity or a particular user. The application service data store 324 may store data regarding a layout, color scheme, or other visual aspects to be presented in a user interface for the application 302. Such visual aspects may be linked to capabilities of the application service 314-1, such as the ability to perform queries or run analytics to be displayed in a user interface for an application instance to be instantiated.

In some embodiments, the application service data store 324 may store data regarding a set of service capabilities selected by the requesting entity (e.g., entity associated with computer system 206-1). During a setup process prior to or in connection with sending the request 208-1 (see FIG. 2), the requesting entity may select the application service 314-1 that is appropriate for the entity's desired application (e.g., enterprise resource planning, mobile application deployment, internet-of-things). The features of the application 302, as presented via a user interface, may be customized as a result of selection of the application service 314-1. During the setup process, the requesting entity may further customize the features provided via a user interface of the application 302 to the requesting entity. The requesting entity may customize the features, for example, by selecting which application features of the application service 314-1 are supported or disabled, or by specifying how application features of the application service 314-1 are to be modified. In some instances, the set of service capabilities may correspond to an upgraded version of the application service 314-1 having features and/or capabilities different than the features and/or capabilities of a default configuration for the application service 314-1.

Returning now to the application 302, in response to the request 316, the service capabilities module 320 may provide, to the capabilities determiner 312, capability information 326 indicating the service capabilities of the application service 314-1, which may include customized capabilities. The capabilities determiner 312 provides the capability information 326 to the application state configurator 306.

The application state configurator 306 compares the defined configuration provided in the defined configuration information 308 with the capability information 326 and determines differences between the defined configuration and the capabilities in the capability information 326. The application state configurator 306 modifies the defined configuration specified in the defined configuration information 308 based on the capability information 326. More particularly, the application state configurator 306 may enable additional features, disable features, or modify existing features of the defined configuration based on the capability information 326 to determine an application configuration 330 for the application 302. The application configuration 330 corresponds to the collection of features/capabilities to be provisioned in the application 302 presented to the requesting entity.

The application state configurator 306 selects, based on the application configuration 330 determined, a set of features 332-1, 332-2, . . . 332-N (collectively "features 332") from among all available features of the application 302. Based on the features 332 selected, the application state configurator recruits a set of the subservices 322 of the application service 314-1 that are appropriate to support the features 332 selected. For instance, the application state configurator 306 may send a request 334 to allocate resources of the subservices 322 corresponding to the set of features 332 to support operation of the application 302.

The application 302 may include an application persistence layer 336 in which information for executing the application 302 in the application configuration 330 is maintained. The application persistence layer 336 may include various types of memory, such as random-access memory, read-only memory, cache memory, etc., for storing data regarding operation of the application 302. Data obtained from the application service data store 324 may be stored, operated on, and otherwise manipulated in the persistence layer 336 during operation of the application 302 in the application configuration 330. Data manipulated in the persistence layer 336 or generated during operation of the application 302 in the application configuration 330 may be stored in the application service data store 324 periodically or when operation of the application 302 is discontinued so that the data can be later retrieved.

Figure 3B:
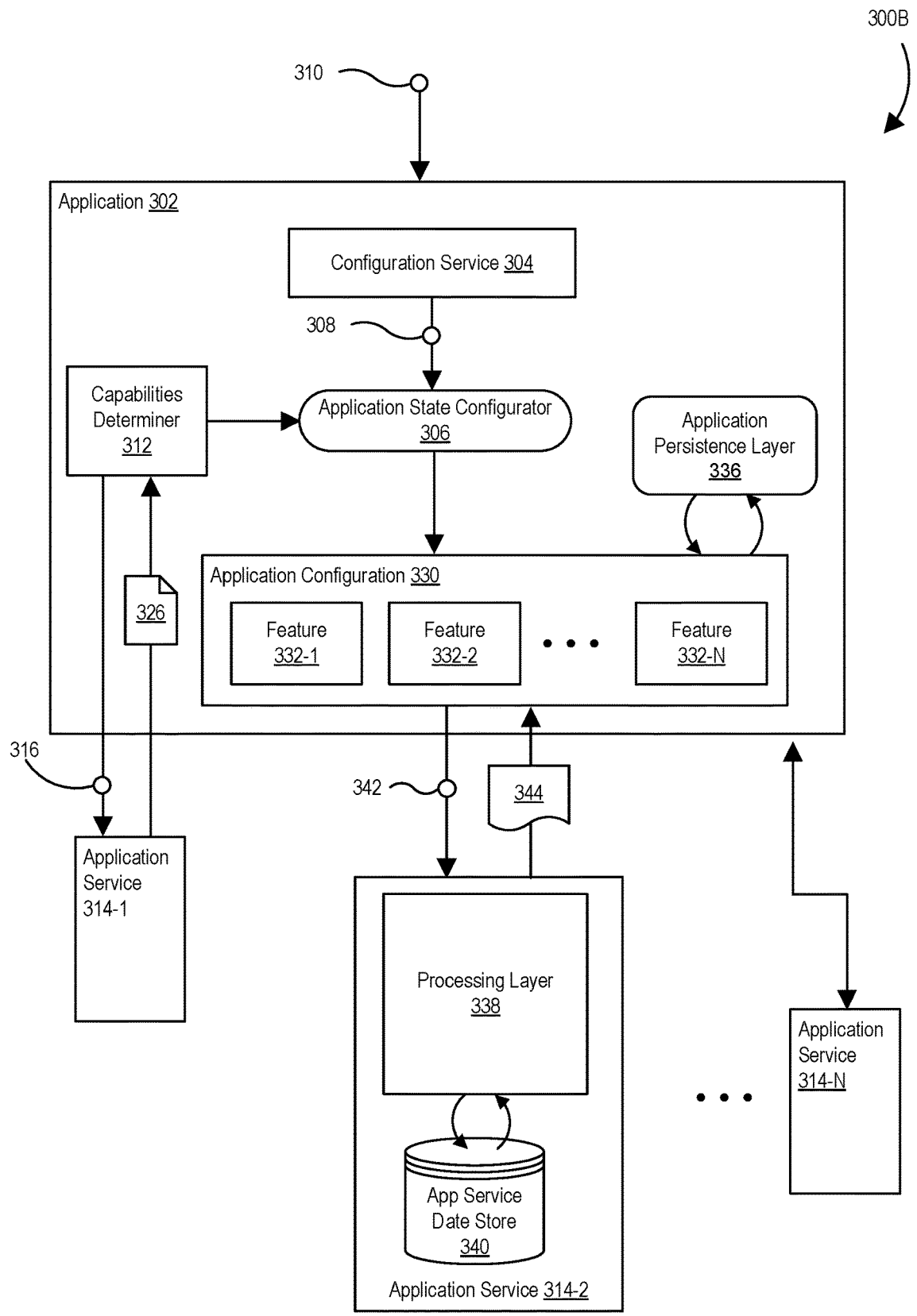
FIG. 3B illustrates a second view of the third example environment in which a computing system of the computing resources service provider operates according to one or more embodiments.

FIG. 3B shows an environment 300B in which a computing system of a computing resources service provider operates according to one or more embodiments. The environment 300B is substantially similar to the environment 300A in a number of respects, so further description thereof is omitted for brevity. In the environment 300B, the application service 314-2 includes a processing layer 338 that is configured to process data in a specific manner By way of non-limiting example, the processing layer 338 may include one or more artificial intelligence models that are trained to perform a specific task, such as recognizing objects in an image, predicting an outcome based on a given set of conditions, or recommending a decision based on a given set of conditions. As another non-limiting example, the processing layer 338 may include one or more virtual machine instances that are provided to process data on behalf of one of the features 332. The application service 314-2 may also include an application service data store 340 similar to the application data store 324 described with respect to the application service 314-1. The application data store 340 may store data specific to the requesting entity and the processing layer 338 may access data of the entity in connection with a request from the application 302.

The application service 314-2 may be assigned to perform or dedicated to processing data for a particular feature of the features 332 in the application configuration 330. As an example, the application service 314-2 may be assigned to forecast future conditions or generate high-definition video on behalf of one of the features 332 of the application 302. The application 302 having the application configuration 330 may send a request 342 to perform one or more processing tasks. The request 342 may include data involved in the processing task(s) or may reference data stored in the application service data store 340 that is involved in the processing task. In response, the processing layer 338 may perform the one or more processing tasks and generate output 344, which may comprise a collection of structured or unstructured data or a stream of data (e.g., video data). In some instances, the processing layer 338 may store data in the application data store 340 in association with an identifier of the entity. In some embodiments, the application service 314-2 may be a computing resource provided to support one or more of the subservices 322. In some embodiments, the application service 314-2 may be provided to directly support or process information for the application 302.

Figure 4:
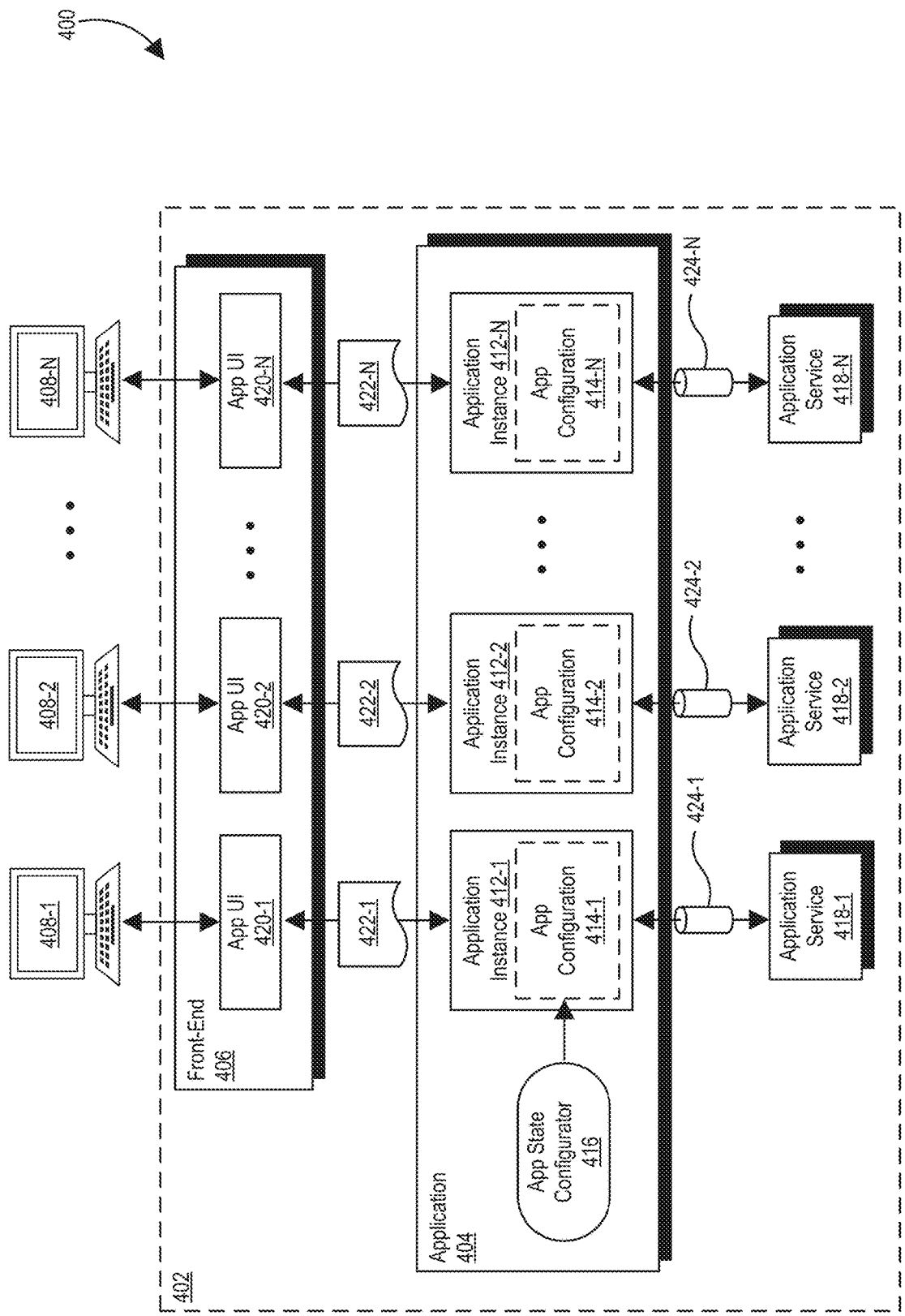
FIG. 4 illustrates a fourth example environment of a computer system of the computing resource service provider operates according to one or more embodiments.

FIG. 4 shows an environment 400 in which a computer system 402 of a computing resource service provider operates according to one or more embodiments. Various features of the environment 400 are substantially similar to those described with respect to FIGS. 1, 2, 3A, 3B, and elsewhere herein, so further description thereof is omitted for brevity. The computer system 402 includes an application 404 supported by a plurality of application services. The computer system 402 includes a front-end layer 406 that facilitates interaction with a set of computer systems 408-1, 408-2, . . . 408-N (collectively "computer systems 408") that are each associated with an entity external to the computer system 402 of the computing resources service provider. As described herein, the computer systems 408 establish a connection with the computer system 402 and request use of the application 404.

Each of the computer systems 408 may request a different set of features for the same application 404. A plurality of application instances 412-1, 412-2, . . . 412-N may be respectively provisioned for and corresponding to the computer systems 408-1, 408-2, . . . 408-N. Each of the application instances 412-1, 412-2, . . . 412-N (collectively "application instances 412") have an application configuration 414-1, 414-2, . . . 414-N (collectively "application configurations 414"). An application instance is a single copy of the application 402 operating using a corresponding application service to provide a customized set of features to an external entity. In some implementations, a collection of computing resources, such as a defined area of memory and/or processing power (e.g., ratio of computing cycles, processing core), may be assigned to operate on behalf of a single instance of the application instances 412.

The application configurations 414-1, 414-2, . . . 414-N may each have a set of features determined and configured by an application state configurator 416. The set of features comprising the application configurations 414 may include user interface features (e.g., buttons, data visualizations, toolbars) and a set of functional features associated with and/or supporting some or all of the user interface features. The application configurations 414 may each include a different layout for how the visual elements of the user interface are to be arranged and may each include a different color scheme, font, logo, etc., for each entity.

The set of features comprising an individual application configuration of the application configurations 414 may be supported by an application service 418-1, 418-2, . . . 418-N on a back end of the computer system 402, as described with respect to FIGS. 3A and 3B. A first application service 418-1 may support features of the application instance 412-1, a second application service 418-2 may support features of the application instance 412-2, and so on. In some implementations, some of the application services of one of the application instances 412 may also be included in application services of another one of the application instances 412. For example, one or more application services of the application service 418-1 may also be included in the application service 418-2.

The application configurations 414 also include features of a user interface of the application 404 presented on the computer systems 408. An application user interface 420-1 may be presented to the computer system 408-1, an application user interface 420-2 may be presented to the computer system 408-2, and so on. In some implementations, the application user interfaces 420-1, 420-2, . . . 420-N (collectively "application user interfaces 420") may look different and have a different collection of user input features. The application user interface 420-1 may, for example, have a database query tool supported by a first application service whereas the application user interface 420-2 may not have a query database tool and therefore is not supported or connected to the first application service. As another example, the application user interface 420-2 may have a dashboard for visualizing data, which is supported by a second application service for processing data to be visualized and supported by a third application service for visualizing the processed data whereas the application user interface 420-1 may not include such features and therefor is not connected to the second and third application services.

The application instances 412 may send and receive data 422-1, 422-2, . . . 422-N to and from the application user interfaces 420-1, 420-2, . . . 420-N, respectively. The application user interfaces 420-1, 420-2, . . . 420-N may include display elements for presenting the data 422-1, 422-2, . . . 422-N to the computer systems 408-1, 408-2, . . . 408-N over one or more networks. The application user interfaces 420-1, 420-2, . . . 420-N may also include user input elements for receiving user input and sending data 422-1, 422-2, . . . 422-N to the application 402. One or more of the features included in the application configurations 414 may correspond to display elements or user input elements of the application user interfaces 420.

Connections 424-1, 424-2, . . . 424-N are established between the application 404 and the application services 418-1, 418-2, . . . 424-N to facilitate the features of the customized application configurations 414-1, 414-2, . . . 414-N. The application instances 412-1, 412-2, . . . 412-N exchange data with the application services 418-1, 418-2, . . . 418-N via the connections 424-1, 424-2, . . . 424-N. The application services 418-1, 418-2, . . . 418-N process data on the back end of the computer system of the computing resources service provider in response to requests from the application instances 412-1, 412-2, . . . 412-N. In some implementations, a plurality of the application services 418 may be assigned to a single application instance 412. For example, the application services 314-1 and 314-2 described with respect to FIGS. 3A and 3B may be assigned to perform operations for the application instance 412-1. A single application service 418 may be assigned to support more than one of the application instances 412-1, 412-2, . . . 412-N. The application services 418-1, 418-2, . . . 418-N may store data that is processed or manipulated in the associated application service data store (e.g., application service data store 324, 340) on behalf of the external entity for future use.

As a result of the foregoing features of a computer system of a computing resources service provider, an application may include set of features that is specific to a particular purpose for a user. As described herein, the particular purpose for which the set of features are configured are, in some embodiments, specific to an industry (e.g., healthcare, supply chain management, finance) or an intended application (e.g., virtual reality, gaming, internet-of-things). In some embodiments, some of the set of features of an application instance 412 may be selected by a user based on their preferences. Moreover, neither the users nor the computing resources service provider has to program or modify the source code of the application to achieve a desired set of features, including visual and functional aspects of the application. The operation and presentation of the application may instead be based on which application services and/or data sources with which the application is connected.

Figure 5:
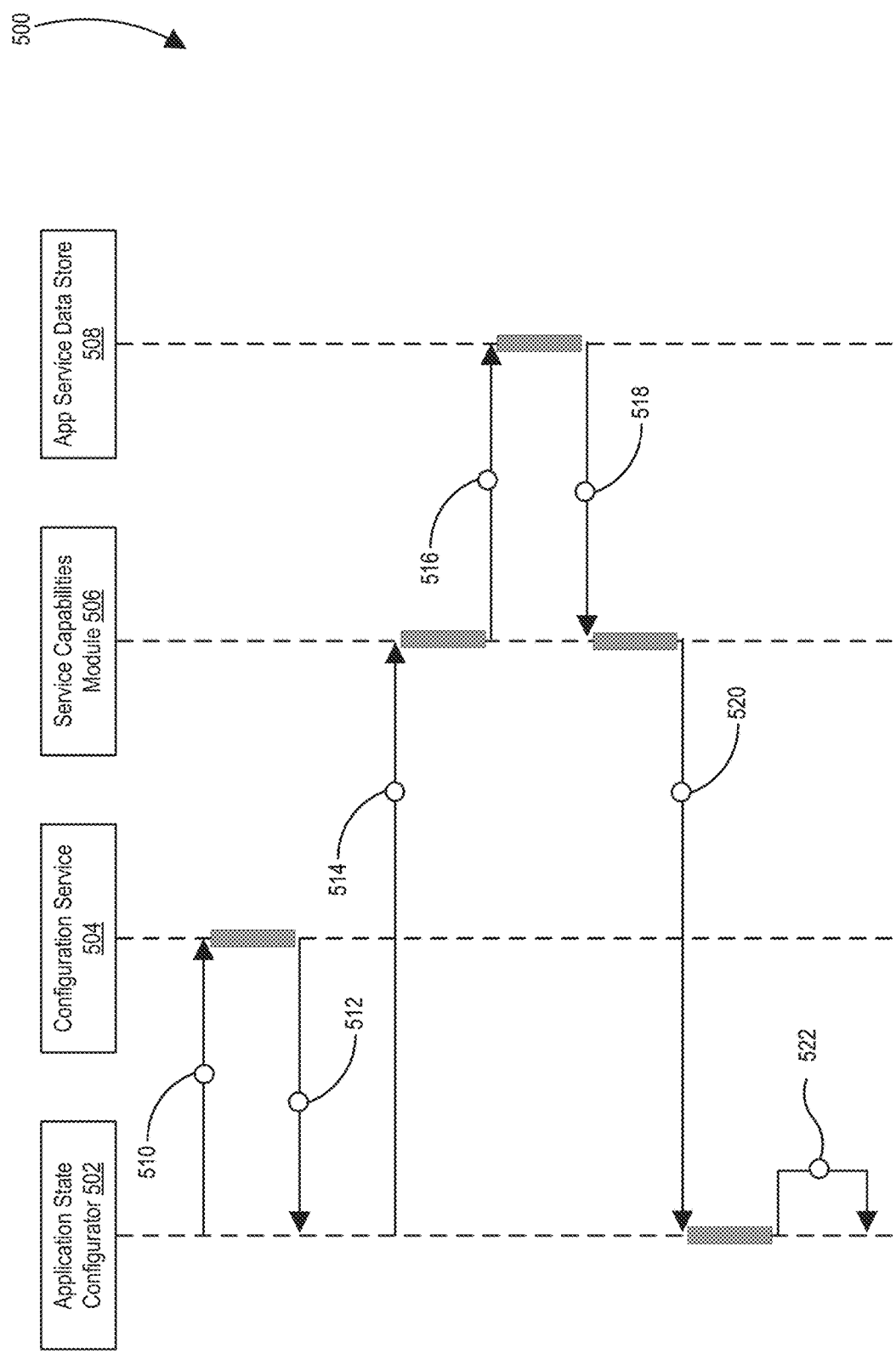
FIG. 5 illustrates a process indicating a data flow for determining a configuration of an application to be provisioned to a computer system according to one or more embodiments.

FIG. 5 shows a process 500 indicating a data flow for determining a configuration of an application to be provisioned to a computer system according to one or more embodiments. The process 500 is performed in response to receiving a request from an external entity computer system to provision an application having a customized set of features. The process 500 involves an application state configurator 502, a configuration service 504, a service capabilities module 506 of an application service, and an application service data store 508 of the application service. A number of other intermediate components may be involved in the process 500, which are not shown for ease of understanding. The process 500, in some embodiments, may be performed in a different order without departing from the scope of the present disclosure. The process 500 may be performed, in some embodiments, as a result of authenticating an identity of the requesting entity and/or a determination that the requesting entity is authorized to access the application having a customized set of features.

The process 500 includes sending, by the application state configurator 502, a request 510 to the configuration service 504 to determine a default configuration for the application. The request 510 may include information associated with the requesting entity, such as identifying information (e.g., username, account number). The request 510 may include information included in the request from the requesting entity, such as an intended use of the application (e.g., enterprise resource planning, supply chain management, human resource management). The configuration service 504 determines a default configuration for the application and may identify a set of features associated with the default configuration. The configuration service then sends a response 512 to the application state configurator 502 including information regarding the default configuration.

The application state configurator 502 then sends a request to the service capabilities module 506 of an application service indicated in a request from the external entity to identify a set of features to be implemented in the application for the requesting entity. In connection with or as part of sending the request 514, the application state configurator 502 may send a request to the capabilities determiner described with respect to FIGS. 2 and 3A. It is understood that the capabilities determiner may send the request 514 to the application service. The request 514 may include an identifier of the requesting entity.

In response to the request 514, the service capabilities module 506 may determine a set of capabilities that the application service is capable of or configured to perform. The service capabilities module 506 may send a request 516 to the application service data store 508 to identify a set of features to be provisioned to the application on behalf of the requesting entity. The set of features retrieved from the application service data store 508 may include custom features, such as features to be supported, disabled, or modified in an application instance. The application service data store 508 may retrieve data identifying the set of features using the identifier of the requesting entity. For instance, the application service data store 508 may perform a query to retrieve data associated with the identifier, the data retrieved specifying the set of features to be implemented. As a result of determining the set of features, the application data store 508 may provide a response 518 including information identifying the set of features to be implemented.

The service capabilities module 506 may determine a subset of capabilities corresponding to the set of features specified in the response 518. In some implementations, the set of capabilities determined by the service capabilities module 506 and the subset of capabilities may be the same set of features. The service capabilities module 506 sends a response 520 to the application state configurator 502 (via the capabilities determiner), the response 520 including the subset of capabilities determined by the service capabilities module 506.

The application state configurator 502 then processes 522 the subset of capabilities and the set of features in the default configuration to determine a custom configuration for the application. More particularly, the application state configurator 502 compares the subset of capabilities identified in the response 520 with the set of features identified in the response 512. Features in the subset of capabilities have priority over features in the default configuration. For instance, the application state configurator 502 determines a custom configuration that adds features included in the subset of capabilities that were omitted in the default configuration, omits features disabled in the subset of capabilities that were included in the default configuration, and modifies existing features in the default configuration as indicated in the subset of capabilities. The application state configurator 502 then implements the set of features of the custom configuration in the application provisioned to the requesting entity, as described herein.

In some embodiments, the application state configurator 502 and the configuration service 504 may operate on a first set of servers and the application service, including the service capabilities module 506, may run on a second set of servers different than the first set of servers. In such embodiments, communications between the application service and the application state configurator 502 (via the capabilities determiner) may be sent over one or more networks. For instance, such communications may be sent using an application-layer communication protocol, such as HTTP. The first set of servers may be in a different location (e.g., different building, different server rack) than the second set of servers. In some embodiments, however, the application state configurator 502, the configuration service 504, and the application service may run on the same set of servers.

Figure 6:
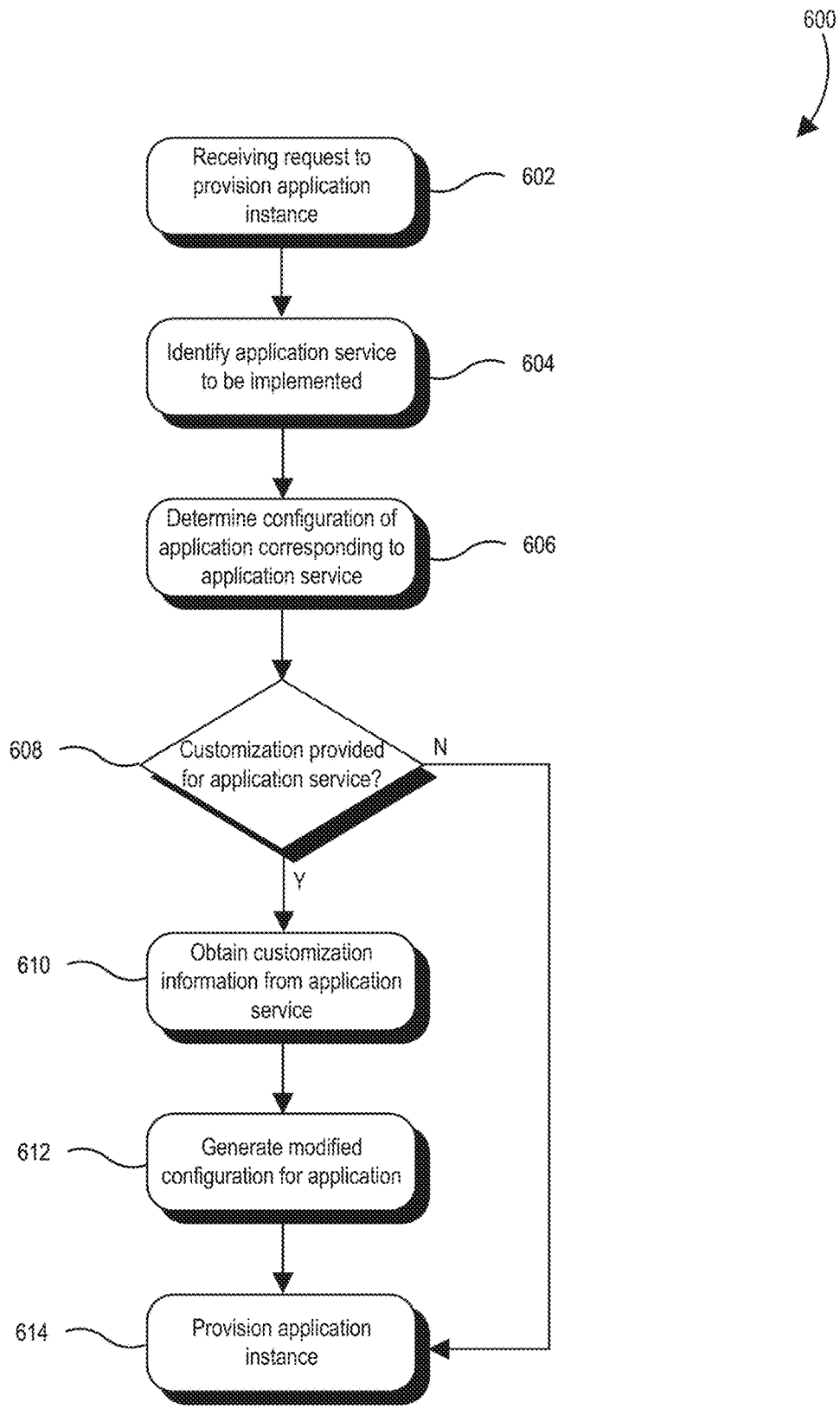
FIG. 6 illustrates a method for supporting customization of an application based on data source capability according to one or more embodiments.

FIG. 6 shows a method for supporting customization of an application based on data source capability according to one or more embodiments. The method 600 may be performed by any appropriate entity described herein, such as the computer system 102 of the computing resource service provider. The method 600 includes receiving, at 602, a request from an external entity (e.g., computer systems 106) over one or more networks to provision an instance of an application. The request may include information, such as a parameter, indicating an application service of a plurality of application services to be implemented to support the application instance. The request, for example, may include a URL parameter specifying the application service to be implemented.

The method 600 also includes identifying, at 604, the application service of the plurality of application services to be implemented to support the application instance. For example, the computer system may process the request from the external entity and identify that the request includes a parameter corresponding to the application service 314-1. In some embodiments, the request may not include information identifying the application service to be implemented; instead, the request may include information specific to the requesting entity, such as an account number or username. The computer system may obtain, from data storage, entity information associated with the requesting entity based on the information included in the request. The entity information obtained may identify the application service to be implemented to support the application instance.

The method 600 further includes determining, at 606, a configuration of the application that corresponds to the application service. For instance, the application may identify a default configuration associated with the application service. Identifying the default configuration may include determining a first set of features to be enabled, a second set of features to be disabled, and a layout/schema for the user interface of the application. The default configuration identified may be stored in data storage of the application or in an application service data store of the application service.

At 608, the method 600 includes determining whether a customization for the application service is associated with the requesting entity. For instance, as described with respect to FIGS. 3A and 3B, a capabilities determiner may send a request to the application service to determine whether a customization configuration is provided for the requesting entity. The application service may access an application service data store and determine whether customization information is associated with an identifier of the requesting external entity.

If a customization is not provided for the external entity in 608, the method 600 proceeds to 614 to provision an application instance having the configuration determined in 606. The application instance may have a default configuration for the application or application service if no customization is provided for the external entity. On the other hand, if a customization is provided for the external entity in 608, the method 600 proceeds to 610, wherein customization information associated with the external entity is obtained (e.g., from an application service data store) and provided to the application. As described herein, the customization information may specify states of features of the application or application service. For instance, the customization information may specify that a first set of features are to be enabled, a second set of features are to be disabled, and may specify modifications to various features.

As a result of the customization information obtained in 610, one or more additional application services may be recruited to support the customized features. With reference to FIGS. 3A and 3B, customization information obtained from the application service 314-1 may involve using features provided by the application service 314-2. Therefore, the application service 314-2 may be recruited by the application 302 to support features specified in the customization information.

The method 600 then proceeds to generate, at 612, a modified configuration for the application based on the configuration determined in 606 and the customization information obtained in 610. An application state configurator of the application may generate the modified configuration by merging the customization information and the configuration. By way of non-limiting example, the application state configurator may modify features of the default configuration as specified in the customization information.

At 614, the method 600 includes provisioning an application instance, over one or more networks, having a configuration to the external entity. Provisioning at 614 the application instance includes generating a user interface having a set of features corresponding to the modified configuration generated in 612. Provisioning at 614 may also include establishing a set of connections (e.g., connections 424) between the application and the application service(s) to be implemented to fulfill the request of the external entity.

Figure 7:
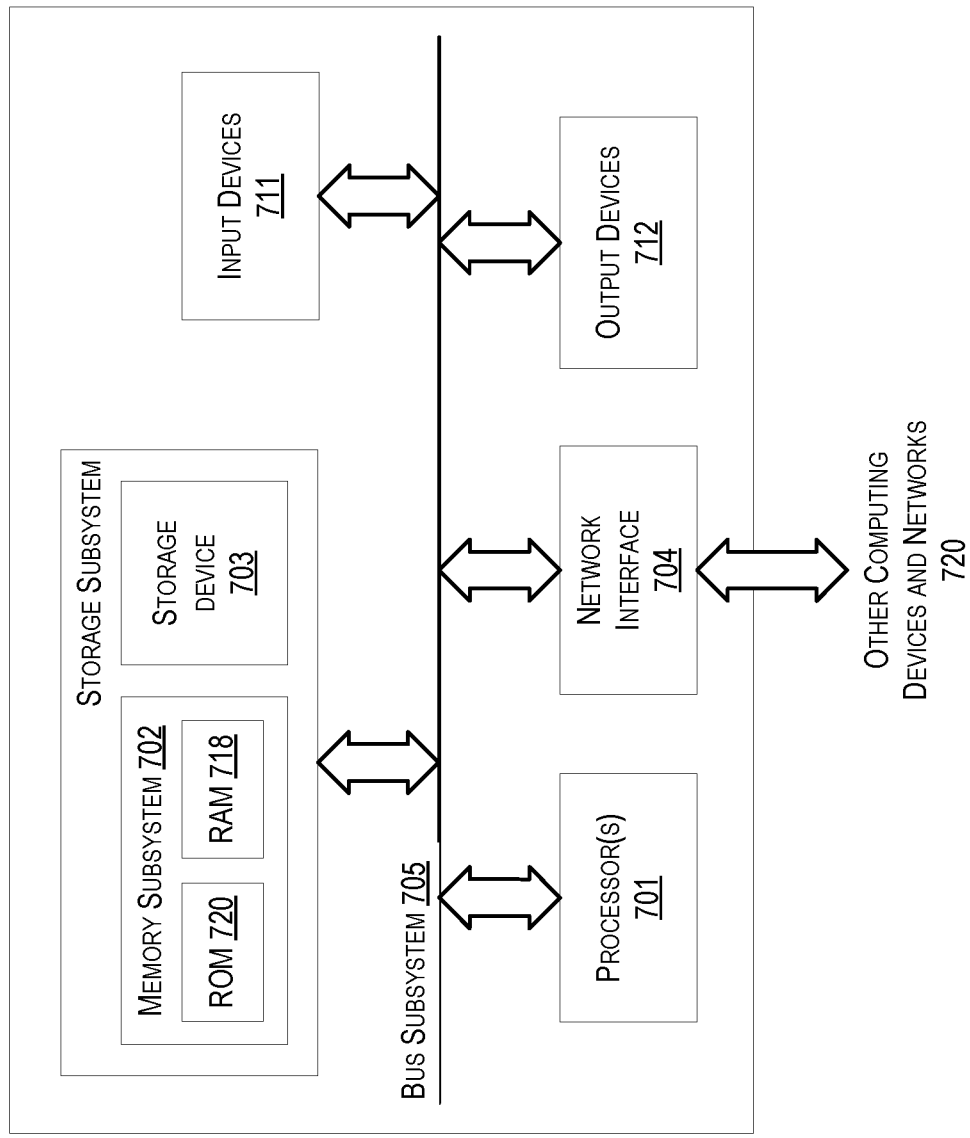
FIG. 7 illustrates hardware of a special purpose computing machine configured according to one or more embodiments.

FIG. 7 illustrates hardware of a special purpose computing machine configured with a dynamic provisioning process according to one embodiment of the present disclosure. As mentioned above, the software servers together may form a cluster, or logical network of computer systems programmed with software programs that communicate with each other and work together to process requests.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM) 718, read only memory (ROM) 720, or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet. For a local network, computer system 710 may communicate with a plurality of other computer machines, such as server. Accordingly, computer system 710 and server computer systems represented by server may form a cloud computing network, which may be programmed with processes described herein. In the Internet example, software components or services may reside on multiple different computer systems 710 or servers across the network. The processes described above may be implemented on one or more servers, for example. A server may transmit actions or messages from one component, through the Internet, a local network 720, and network interface 704 to a component on computer system 710. The software components and processes described above may be implemented on any computer system and send and/or receive information across a network, for example.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

The invention claimed is:

1. A computer-implemented method comprising:
receiving, over one or more networks, a first request from an external entity to provision an instance of an application of a plurality of instances;
identifying an application service of a plurality of application services to be implemented to fulfill the first request;
determining a configuration of the application corresponding to the application service;
determining that a customization for the application service is associated with the external entity, wherein each application service of the plurality of application services comprises a different set of capabilities and settings that modify functionality, user interface elements, or other features of the application;
obtaining customization information regarding states of a set of features to be implemented in the instance of the application as a result of determining the customization associated with the external entity;
generating a modified configuration for the application based on the customization information and the configuration of the application; and
dynamically provisioning, over the one or more networks, the instance of the application having the modified configuration to the external entity.

2. The method of claim 1, comprising:
sending a second request to the application service to provide the customization information based on an identifier of the external entity; and
receiving, from the application service, the customization information.

3. The method of claim 1, comprising:
receiving, over the one or more networks during a setup process for the application, a communication from the external entity specifying a customized configuration for the application, wherein the customization information is generated based on the customized configuration specified.

4. The method of claim 1, comprising:
establishing a connection between the application and the application service to support operation of the instance of the application.

5. The method of claim 1, wherein the application service corresponds to an industry with which the external entity is involved.

6. The method of claim 1, wherein the customization information is obtained using an identifier associated with the external entity.

7. The method of claim 1, wherein the first request includes a parameter corresponding to the application service.

8. The method of claim 1, wherein the application service of the plurality of application services further comprises a plurality of subservices, wherein the plurality of subservices is configurable to perform one or more functions associated with a capability.

9. A computer system, comprising:
one or more processors; and
memory storing instructions that, as a result of execution by the one or more processors, cause the computer system to:

receive, over one or more networks, a first request from a first external entity to provision a first instance of an application of a plurality of instances;

identify a first application service of a plurality of first application services to be implemented based on the first request;

determine a first configuration of the application corresponding to the first application service;

determine that a first customization for the first application service is associated with the first external entity, wherein each application service of the plurality of application services comprises a different set of capabilities and settings that modify functionality, user interface elements, or other features of the application;

obtain first customization information indicating a first set of features to be implemented in the first instance of the application as a result of determining the customization associated with the first external entity;

generate a first modified configuration for the application based on the first customization information and the configuration of the application; and dynamically provision, over the one or more networks, the first instance of the application having the first modified configuration to the first external entity.

10. The computer system of claim 9, execution of the instructions by the one or more processors causing the system to:

receive, over the one or more networks, a second request from a second external entity to provision a second instance of the application of the plurality of instances;

identify a second application service of the plurality of application services to be implemented based on the second request;

determine a second configuration of the application corresponding to the second application service;

determine that a second customization for the second application service is associated with the second external entity;

obtain second customization information regarding states of a second set of features to be implemented in the second instance of the application as a result of determining the customization associated with the second external entity;

generate a second modified configuration for the application based on the customization information and the configuration; and dynamically provision, over the one or more networks, the second instance of the application having the second modified configuration to the second external entity.

11. The computer system of claim 9, execution of the instructions by the one or more processors causing the system to:

obtain, from data storage of the first application service, information identifying the first set of features based on an identifier of the first external entity.

12. The computer system of claim 9, execution of the instructions by the one or more processors causing the system to:

receive, over the one or more networks during a setup process for the application, a communication from the first external entity specifying states of the first set of features to be associated with an identifier of the first external entity.

13. The computer system of claim 9, execution of the instructions by the one or more processors causing the system to:

send a second request to the application service to provide the customization information based on the identifier of the external entity; and receive, from the application service, the customization information.

14. The computer system of claim 9, wherein the customization information is obtained using an identifier associated with the external entity.

15. The computer system of claim 9, wherein the customized instance of the application provisioned including a user interface having a set of features corresponding to the configuration of the first application service modified based on the first set of features.

16. The computer system of claim 9, wherein the first request includes a parameter corresponding to the application service.

17. A non-transitory computer readable storage medium storing instructions that, as a result of execution by one or more processors, cause the one or more processors to:

receive, over one or more networks, a first request from a first external entity to provision a first instance of an application of a plurality of instances;

identify a first application service of a plurality of first application services to be implemented based on the first request;

determine a first configuration of the application corresponding to the first application service;

determine that a first customization for the first application service is associated with the first external entity, wherein each application service of the plurality of application services comprises a different set of capabilities and settings that modify functionality, user interface elements, or other features of the application;

obtain first customization information indicating a first set of features to be implemented in the first instance of the application as a result of determining the customization associated with the first external entity;

generate a first modified configuration for the application based on the customization information and the configuration; and dynamically provision, over the one or more networks, the first instance of the application having the first modified configuration to the first external entity.

18. The non-transitory computer readable storage medium of claim 17, wherein the customization information is obtained using an identifier associated with the first external entity.

19. The non-transitory computer readable storage medium of claim 18, execution of the instructions causing the one or more processors to:

receive, over the one or more networks during a setup process for the application, a communication from the first external entity specifying states of the first set of features to be associated with an identifier of the first external entity.

20. The non-transitory computer readable storage medium of claim 17, execution of the instructions causing the one or more processors to:

establish connections between the application and a plurality of application services to support operation of the customized instance of the application.

* * * * *